US006921489B2

(12) United States Patent
Albertson

(10) Patent No.: US 6,921,489 B2
(45) Date of Patent: Jul. 26, 2005

(54) AERATED GRIT CHAMBER AND METHOD

(76) Inventor: Orris E. Albertson, 356 Bailey Loop, LaBarge, WY (US) 83123

( * ) Notice: Subject to any disclaimer, the term of this patent is extended or adjusted under 35 U.S.C. 154(b) by 176 days.

(21) Appl. No.: 10/199,868

(22) Filed: Jul. 19, 2002

(65) Prior Publication Data

US 2004/0011738 A1 Jan. 22, 2004

(51) Int. Cl.[7] .............................................. B01D 21/00
(52) U.S. Cl. ....................................................... 210/802
(58) Field of Search ........................................ 210/802

(56) References Cited

U.S. PATENT DOCUMENTS 4,303,516 A * 12/1981 Stensel et al. ........... 210/195.4
4,532,038 A *  7/1985 Reid ........................... 210/194
5,908,040 A *  6/1999 Defraites, Jr.

* cited by examiner

Primary Examiner—Chester T. Barry
(74) Attorney, Agent, or Firm—Blackwell Sanders Peper Martin LLP

(57) ABSTRACT

An aerated grit chamber includes an aeration zone in which influent is vigorously aerated and a settling zone separated from the aeration zone by a baffle beneath which wastewater flows from the aeration zone into the settling zone. The aeration causes swirling motion and causes larger grit particles to settle and accumulate in a grit trough on the floor. An inclined plate settler in the upper part of the settling zone causes smaller grit to settle and fall into the grit trough. In order to prevent overly efficient operation at low flow rates and settling of organics with the grit, internal recycling of the wastewater from the settling zone back into the aeration zone is effected, preferably with air lift to induce recycling but also using alternative techniques such as direct pumping.

10 Claims, 4 Drawing Sheets

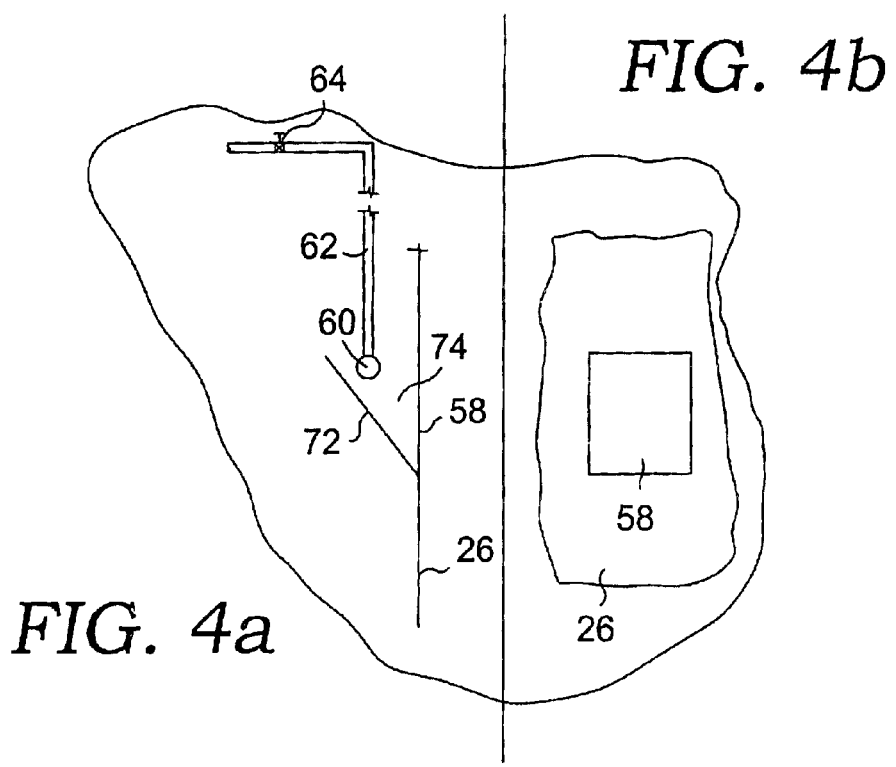
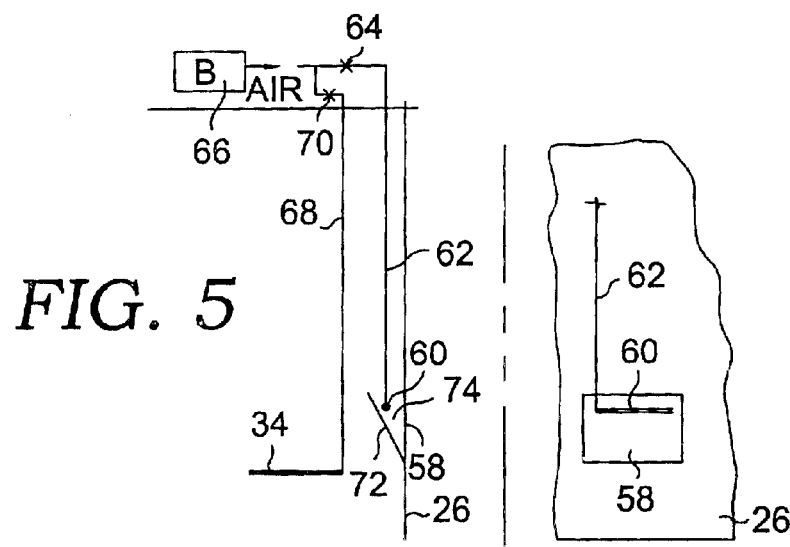

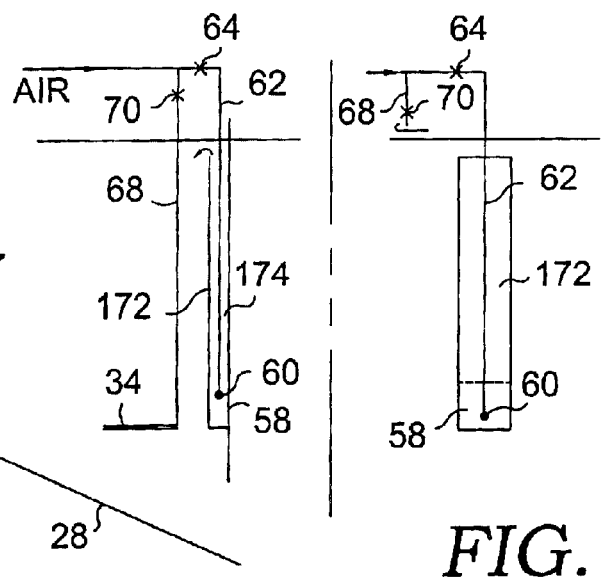
FIG. 7
FIG. 8
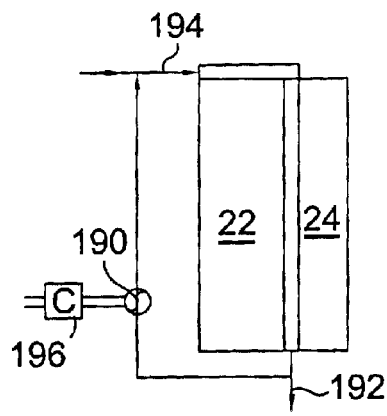
FIG. 9
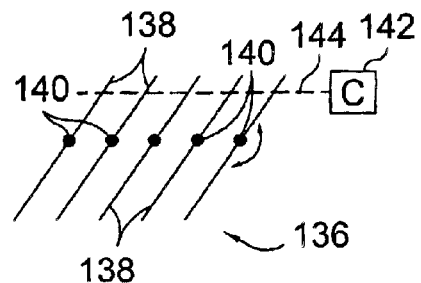
FIG. 10

AERATED GRIT CHAMBER AND METHOD

FIELD OF THE INVENTION

This invention relates generally to the treatment of wastewater and more particularly to a method and apparatus for effectively removing grit from wastewater.

BACKGROUND OF THE INVENTION

Wastewater is typically collected and directed through a matrix of underground pipes that connect to the surface area through connections that are accessible by way of manholes. Liquids and solids can enter the sewer system through openings in the manhole covers, cracks in the piping, and in various other ways during construction activities and otherwise. When water seeps into the sewer pipes, the water can carry with it inert solid particles of various types. The solids can be as coarse as 4–25 mm gravel, but it is more common for sand sized at 0.10–2.0 mm and silt less than 0.10 mm to be carried into the sewer system by the water. The inert material that enters the sewer system in this way can range from less than 0.007 cubic meters per megaliter to more than 0.7 cubic meters per megaliter. Piping that is relatively old and systems having combined storm drainage and wastewater piping generally have the highest amount of grit.

The presence of grit in the wastewater that is collected for treatment has a number of harmful effects, including excessive wear on pumps and other equipment and blockages in pipes, valves, pumps and other parts of the sewage treatment system. When grit builds up to excessive levels in aeration basins or digesters, the basins or digesters must be taken out of service, and the costs to clean and repair the treatment system can be considerable. For these reasons, it has been recognized that grit should be removed at an early stage of the wastewater treatment process.

Standard grit separation practices make use of the high settling rates of the relatively dense grit particles. Grit settles at a higher velocity than most of the other particles in wastewater because the specific gravity of the grit is generally higher. Even so, organic particles that are relatively large can have settling rates that approximate those of finer grit-silt particles. Consequently, efforts to remove the finer grit particles also tend to remove at least the larger organic particles. The organics are removed with the grit because coarse organics (coffee grounds, for example) also have high settling rates. Also, organics can be entrapped by grit particles and settle with them.

The removal of grit larger than +65 or +100 mesh on the Tyler scale is desirable because it can drastically reduce the operation and maintenance costs of a wastewater treatment system. However, conventional aerated grit chambers are not always able to remove +65 mesh particles or even +35 mesh particles at times because of the way in which the grit chambers are designed.

Among the techniques used to remove grit are gravity settling in devices commonly known as "Detritors", hydrocyclone degritting, cyclonic separation, and aerated grit chamber separation. The present invention is directed to improvements in the aerated grit chamber.

Past efforts to improve the performance of aerated grit chambers have included the provision of internal cross baffles and longitudinal baffles, airflow control, and the tapering of air. The baffles are used to reduce short circuiting of the flow through the central core of the grit chamber which lowers efficiency. However, even with the improvements that have been made, the grit chamber still is relatively inefficient over the wide ranges of influent flow that are encountered as a matter of course. It is common for the influent flow to vary during a 24 hour period between less than 40% of the average flow (during the night typically) to more than 250% of the average flow at peak periods.

A conventional grit chamber uses a rectangular basin in which air is distributed at one side to create a spiral flow pattern of water in the basin. Cross baffles and longitudinal baffles are often used to prevent short circuiting at the center. The basin is agitated heavily with water velocities of about 18–36 meters per minute. At these velocities, organics are washed from the grit particles. Multiple passes of the grit laden liquid across the floor causes the grit to be deposited on the floor or in a trough or hopper located in the floor. The collected grit is removed and further cleaned by hydrocyclones or other washing equipment.

In actual practice, the high energy levels resulting from the robust aeration has prevented aerated grit chambers from operating as efficiently as desirable. Grit particles of 0.210 mm and 0.149 mm size settle in a quiescent liquid at 1.32 meters per minute and 0.91 meter per minute, respectively. The actual liquid velocity of about 18–36 meters per minute is thus 14–40 times higher than the settling rate of these particles (which are 65 and 100 Tyler mesh particles).

One fundamental problem is that there is co-mingling of the turbulent aeration action with the gravity separation. Finer grit is lost with the effluent overflow by the high velocity currents that are created by the vigorous aeration forces. Particles as large as 20 mesh (0.847 mm) can be carried out of the grit chamber. There are a large number, that is, most of these conventional grit chambers currently operate without removing grit in an effective manner.

Inclined plate separators known as Lamella units have long been used in various types of equipment for separating solids from liquid and in other separation applications. Lamella units have been used in the clarification of raw sewage to accelerate the separation process of solids from the liquid. A plate separator of this type uses inclined plates to increase the effective area of the settling zone and thus enhance clarification while making efficient use of space. A plate separator can increase the effective area of the clarification by 400%–600% and can thus reduce the space to 20%–25% of what would otherwise be required without an adverse effect on performance. The degree of enhanced settling depends on the spacing between the plates, their angle of inclination, and their length.

Using a plate separator in an aerated grit chamber can enhance its effectiveness. Also, providing separate aeration and settling zones can enhance settling performance. However, the problem still remains of preventing the grit removal chamber from being overly efficient at low flow rates such that organics are removed with the grit. Excessive levels of organic removal in the grit chamber can result in a sludge buildup that creates septic conditions, odors, sludge flotation which plugs the separator plates and blocks flow through the grit chamber.

SUMMARY OF THE INVENTION

The present invention is directed to an improved aerated grit chamber that makes use of novel techniques for enhancing efficiency. In general, the invention has three more specific objects. First, it is one object of the invention to provide a method and apparatus for improving the grit removal efficiency to a point where both new and existing grit chambers can be operated at a desired efficiency, often at a higher treatment capacity than has been achieved in the past. Another object of the invention is to provide a method and apparatus for reliably removing grit particles as small as 150–200 mesh without removing excessive quantities of organic material with them. A further object of the invention is to provide a method and apparatus for removing grit particles from wastewater such that sand or other particles of specific selected sizes can be removed in a reliable manner.

In accordance with the invention, an aerated grit chamber has an aeration zone and a clarification zone separated by a baffle beneath which wastewater can flow from the aeration zone to the clarification zone. Air agitation in the aeration zone and circulation of the wastewater causes large grit particles to settle into a trough on the floor. Smaller grit particles reach the clarification chamber where they are settled by means of an inclined plate settler. This arrangement results in efficient removal of the grit.

However, at low flow rates, it can be overly efficient so that excessive amounts of organics are removed as well as the grit. The organics can accumulate on the floor to create a septic condition under the plates. This problem is overcome in the present invention by using an internal recycling technique that can be implemented in different ways. The wastewater can be recycled through openings in the baffle that separates the aeration zone from the clarification zone, using air lift to induce and enhance the recycling process. Alternatively, direct pumping can be used for the recycling, with the pump operation controlled by the influent flow rate.

Another aspect of the invention involves reducing the efficiency of the plate settler at low flow rates by reducing the effective area of the plates when the flow rate is low. This can be accomplished by varying the angle at which the plates are inclined in accordance with changes in the influent flow rate. As result, the removal of organic material with the grit is minimized when the influent flow rate is low.

Other and further objects of the invention, together with the features of novelty appurtenant thereto, will appear in the course of the following description.

BRIEF DESCRIPTION OF THE SEVERAL VIEWS OF THE DRAWINGS

In the accompanying drawings which form a part of the specification and are to be read in conjunction therewith and in which like reference numerals are used to indicate like parts in the various views:

FIGS. 4a and 4b are diagrammatic views illustrating an internal recycling feature used in a preferred embodiment of the invention;

FIG. 5 is a diagrammatic end elevational view of the internal recycling feature shown in FIGS. 4a and 4b;

FIG. 6 is a diagrammatic side elevational view of the internal recycling feature shown in FIG. 5;

FIG. 7 is a diagrammatic end elevational view of an alternative recycling arrangement constructed in accordance with the present invention;

FIG. 8 is a side elevational view showing the external recycling feature of FIG. 7;

FIG. 9 is a diagrammatic view of an internal recycling arrangement using pump recycling that is an alternative to the internal recycling arrangements shown in FIGS. 4–8; and FIG. 10 is a schematic view of an alternative embodiment of the invention in which the plates of an inclined plate settler in the clarification zone are adjustable as to their angle from vertical.

DETAILED DESCRIPTION OF THE INVENTION

Figure 1:
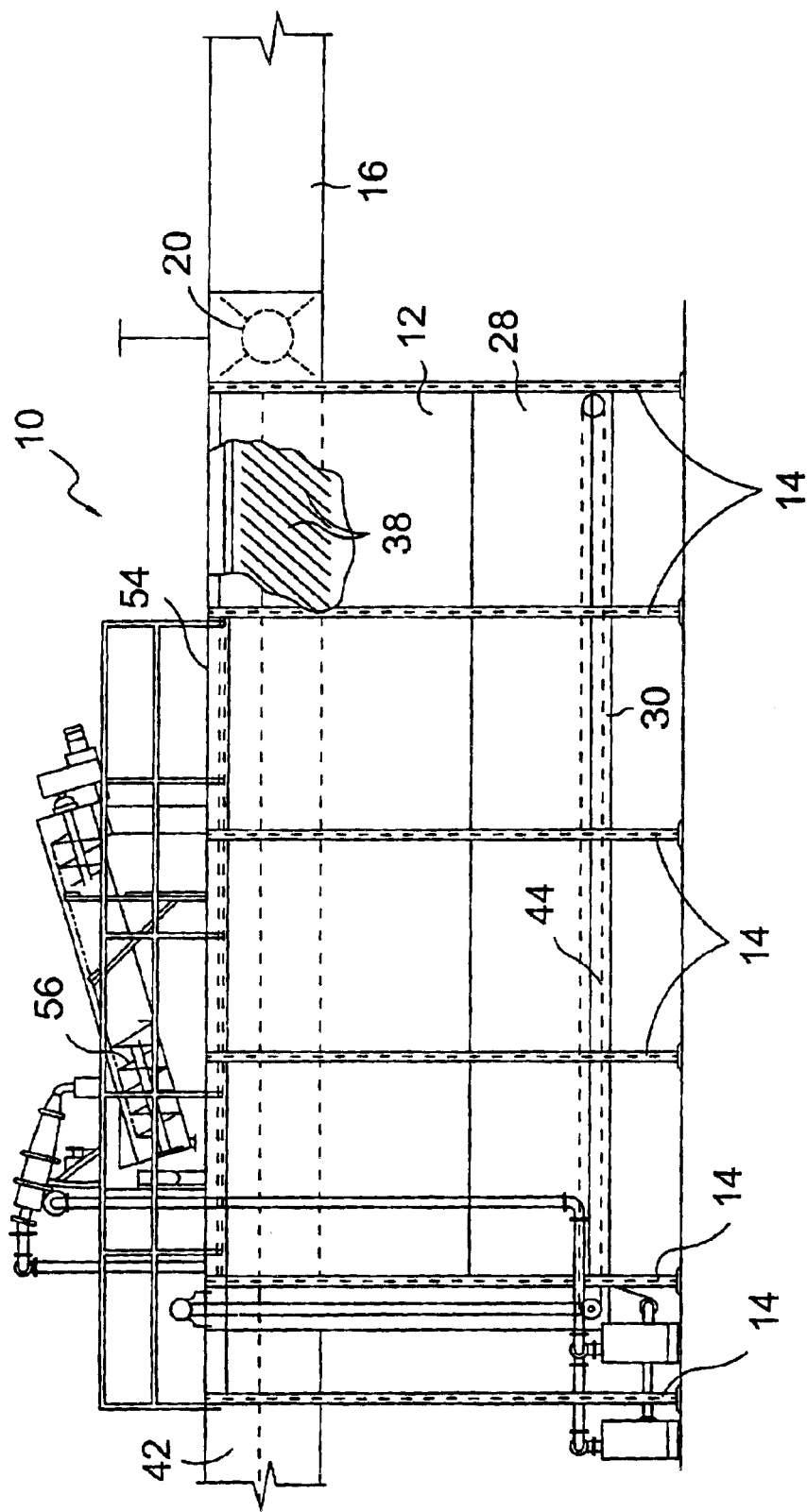
FIG. 1 is a side elevational view of an aerated grit chamber constructed in accordance with a preferred embodiment of the present invention, with a portion broken away for purposes of illustration.
Figure 2:
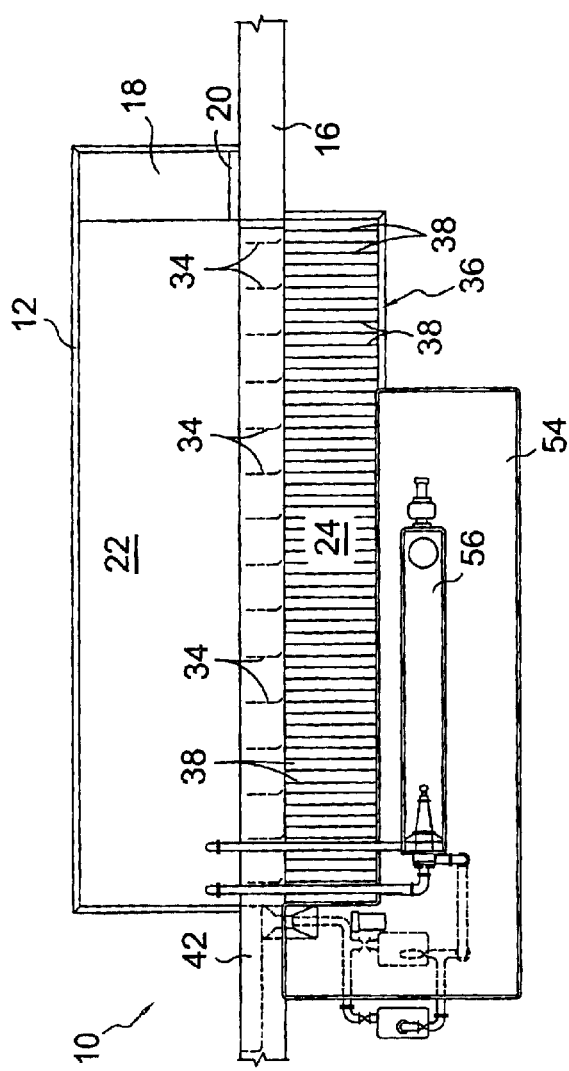
FIG. 2 is a top plan view of the grit chamber shown in FIG. 1.

Referring now to the drawings in more detail and initially to FIGS. 1 and 2 in particular, numeral 10 generally designates an aerated grit chamber constructed in accordance with a preferred embodiment of the present invention which may be installed on a concrete or fabricated metal basin. The grit chamber 10 has a basin which may take the form of a rectangular metal tank 12 mounted on a plurality of vertical legs 14. Wastewater containing grit, organic materials and other impurities, is delivered to the tank 12 through an influent channel 16 which delivers the influent to an influent launder 18 equipped with a gate 20.

Figure 3:
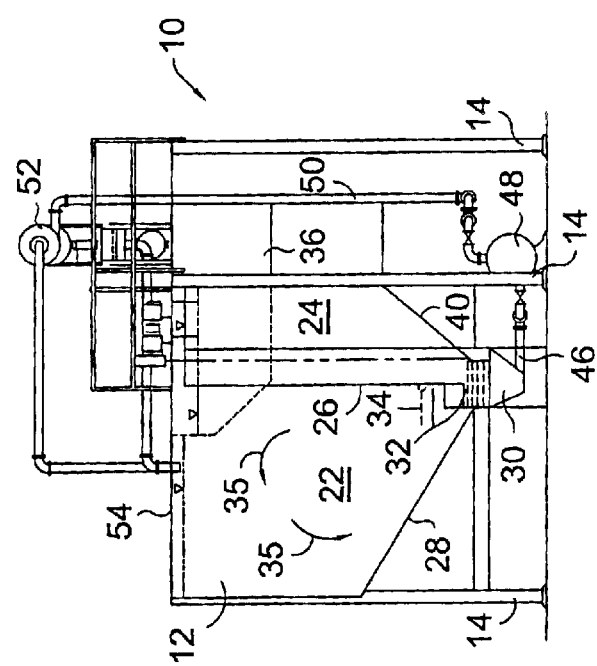
FIG. 3 is an end elevational view of the grit chamber shown in FIGS. 1 and 2.

The interior of the tank 12 is separated into an aeration zone 22 extending along one side wall of the tank and a settling or clarification zone 24 extending along an opposite side wall of the tank and separated from the aeration zone by a vertical baffle 26 (see FIGS. 3 and 4). The influent wastewater is delivered to the aeration zone 22 from the influent launder 18. As best shown in FIG. 3, the aeration zone 22 is provided with an inclined floor 28 which slopes downwardly toward an elongated trough 30 forming a grit collection hopper in the central part of the floor of the tank 12 generally below the baffle 26. The baffle 26 has a lower edge 32 located above the floor of the tank and above the trough 30 so that the wastewater can flow beneath the lower baffle edge 32 into the aeration zone 24. The aeration zone 22 is equipped with a plurality of submerged aerators 34 which are supplied with air under pressure by a suitable blower system in order to vigorously aerate the wastewater in the aeration zone 22. The arrangement and location of the aerators 34 is such that the wastewater in the aeration zone 22 is swirled around in the aeration zone (as indicated by the directional arrows 35 in FIG. 3) to enhance separation of the larger grit particles in the wastewater and cause them to separate and collect in the trough 30 before the wastewater flows beneath the baffle 26 into the clarification zone 24.

The upper portion of the settling or clarification zone 24 is equipped with an inclined plate settler 36 which includes a plurality of inclined plates 38 (FIGS. 1 and 2) which are spaced uniformly apart. The clarification zone 24 has an inclined floor 40 (FIG. 3) which slopes downwardly toward the collection trough 30. The finer grit particles that are separated by the inclined plate separator 36 fall under the influence of gravity to the bottom of the clarification zone 24 and along the floor 40 into the trough 30. The effluent which overflows the clarification zone 24 enters an effluent channel 42 which extends out of the grit chamber 10 to direct the effluent to further treatment equipment.

The grit which collects in the hopper or trough 30 on the floor of the chamber is conveyed along the length of the trough by a mechanical rake 44 driven by a suitable motor and transporting the grit to an underflow pipe 46 (FIG. 3) that connects with a grit pump 48. The discharge side of the grit pump 48 connects with vertical piping 50 that extends upwardly to the inlet of a hydrocyclone 52 mounted on a platform 54 at the top of the unit. The hydrocyclone separates the grit from the water by cyclonic action and discharges the grit and heavier organic particles to an auger 56 in which the grit is conveyed for further handling.

In accordance with the present invention, internal recycling is used particularly at low flow rates in order to recycle the wastewater from the clarification zone 24 to the aeration zone 22. With reference to FIGS. 4a and 4b in particular, the baffle 26 is provided near its lower end with a plurality of spaced apart openings 58 which may be rectangular or another shape. The openings 56 are located well below the half-depth of the liquid in the aeration zone 22. Suitable aerators 60 are located in the aeration zone 22 in proximity to the openings 58 and are supplied with air under pressure through air pipes 62. As shown additionally in FIG. 5, the pipes 62 are equipped with a valve 64 and receive air from a conventional blower 66. The aerators 34 may also be supplied with air from the blower 66 through suitable piping 68 which may be equipped with a valve 70. An inclined panel 72 is provided for each opening 58. Each panel 72 has its lower end connected with the baffle 26 at a location adjacent to the bottom of the opening 58. Each panel 72 inclines upwardly into the aeration zone 22 and is adjacent to the opening 58, preferably terminating at or above the level of the top of the opening 58. In this manner, each panel 72 provides a pocket 74 adjacent to each opening 58. The aerators 60 are located in or at least adjacent to the pockets 74. The air lift effect provided by the air that is applied by the aerator 60 is enhanced by the pocket construction and the presence of the panels 72 in order to induce the flow of the wastewater through openings 58 from the clarification zone 24 back into the aeration zone 22.

In operation, influent wastewater is directed through the influent channel 16 and into the launder 18 from which the wastewater enters the aeration zone 22. There, the aerators 34 operate to create a swirling motion of the wastewater which enhances the separation of the larger grit particles which are collected in the trough 30. The wastewater flows beneath the lower edge 32 of baffle 26 into the clarification zone where the finer grit particles are separated by the inclined plate settler 36. The finer grit particles and silt fall by gravity along the inclined floor 40 and into the trough 30. The use of the inclined plate settler 36 in the clarification zone enhances the removal of the finer grit so that the overall operation of the grit chamber is enhanced and is able to remove fine grit particles. The grit that collects in the trough 30 is conveyed and disposed of in the manner previously described.

The valve 64 is controlled in accordance with the influent flow rate. In order to prevent the unit from operating so efficiently at low flow rates that larger organic particles are separated along with the grit in the clarification zone, the internal recycle feature of the invention is activated when the flow is relatively low. When the valve 64 is opened, which occurs when a low flow rate is sensed and in varying degrees depending upon the flow rate, air from the blower 66 is supplied through the pipes 62 to the aerator 60. The aerators apply the air to the wastewater and create an air lift effect adjacent to the openings 58, thus inducing the flow of the wastewater from the clarification zone 24 back into the aeration zone 22. As a result, the inclined plate settler 36 is subjected to a flow rate that allows it to effectively separate grit particles from the wastewater without undue removal of organics that can create problems with septic conditions in the grit chamber.

The recycling is controlled to maintain the organic content of the wastewater in an aerobic state so that it does not settle significantly in the grit chamber and create septic conditions. The air control valve 64 is suitably controlled in accordance with the flow rate to control the amount of air that is applied by the aerator 60. In turn, this controls the amount of water that is recycled in accordance with the flow rate. Accordingly, at low flow rates, the amount of water that is recycled can be increased in order to achieve the advantages previously described.

Referring now to FIGS. 7 and 8, an alternative arrangement is illustrated which differs from what has been described in that the inclined panels 72 are replaced by open-topped vertical tubes 172 that may be cylindrical, rectilinear or another shape. Each of the tubes 172 provides a pocket 174 in the aeration zone 22 at a location adjacent to the opening 58. The aerators 60 are located in the pockets 174 near their lower ends and adjacent to the openings 58.

Due to the vertical extent of the tubes 172, the air lift effect can be enhanced through use of the tubes 172.

FIG. 9 depicts a recycle arrangement that differs from what has been previously described in that a pump 190 is used to recycle the effluent discharged from the grit chamber back to the aeration zone. The suction side of the pump 190 connects with an effluent line 192 (corresponding to the effluent channel 42 shown in FIG. 1) which receives the effluent from the clarification zone. The discharge side of the pump 190 connects with a line 194 leading into the aeration zone of the grit chamber. The pump 190 is controlled in its operation by a suitable control system 196 which is programed to operate the pump at flow rates that are proportional to the need for recycling as defined by the influent flow rate. In this manner, the grit chamber effluent in the effluent line 192 is recycled to the aeration zone to maintain a substantially constant flow rate through the plate settler 36 and hence limits the organic solids build up in the clarification zone.

FIG. 10 depicts yet another alternative arrangement in which a plate settler 136 can be installed in an aerated grit chamber which may be constructed identically to the grit chamber 10 except that there is no internal recycle provided. The plate settler 136 includes a plurality of inclined plates 138 that are each pivotal about an axis 140 to allow the plates to be adjusted as to their inclination from vertical all at the same time. Adjustment of the plates can be carried out through a suitable control 142 having a mechanical connection 144 with the plates 138. In this embodiment of the invention, the effective area of the plates 138 is reduced at low flow rates by pivoting the plates to a more vertical inclination. At higher flow rates, the plates are adjusted to a less vertical inclination. Consequently, the plate settler 136 is less efficient at low flow rates to prevent troublesome amounts of organics from being removed with the grit particles.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A method of removing inorganic grit particles from liquid also having an organic content, comprising the steps of:

aerating the liquid in an aeration zone to effect settling of some of the grit particles in said aeration zone;

directing the liquid into a clarification zone following aeration of the liquid;

utilizing an inclined plate settler in said clarification zone to collect additional grit particles and effect settling of said additional grit particles by gravity in said clarification zone;

recycling controlled amounts of liquid from the clarification zone back to the aeration zone in a manner to inhibit settling of organic content in said clarification zone; and removing the grit particles that settle in said aeration zone and clarification zone.

2. A method as set forth in claim 1, wherein said step of recycling controllable amounts of liquid comprises directing liquid from a lower portion of the clarification zone back into the aeration zone.

3. A method as set forth in claim 2, wherein said lower portion of the clarification zone is at a depth greater than half the depth of the liquid in the clarification zone.

4. A method as set forth in claim 1, wherein said step of recycling controllable amounts of liquid comprises applying an air lift force in said aeration zone to induce flow of liquid from the clarification zone back into the aeration zone.

5. A method as set forth in claim 1, wherein said step of recycling controllable amounts of liquid comprises pumping liquid from the clarification zone back into the aeration zone.

6. A method as set forth in claim 1, including the step of controlling the amounts of liquid recycled from the clarification zone back to the aeration zone in a manner to maintain the organic content of the liquid in a substantially aerobic state to inhibit settling of the organic content with the grit particles.

7. A method as set forth in claim 1, wherein said step of recycling controllable amounts of liquid comprises:

providing a passage from the clarification zone to the aeration zone;

applying air to the aeration zone at a location adjacent to said passage to induce flow through said passage from the clarification zone to the aeration zone.

8. A method as set forth in claim 7, including the step of providing a pocket open at the top in the aeration zone adjacent said passage, said step of applying air comprising applying air in said pocket.

9. A method of removing grit from wastewater having varying flow rates and containing organic material, comprising the steps of:

aerating the liquid in an aeration zone;

directing the liquid into a clarification zone following aeration of the liquid;

providing in said clarification zone an inclined plate settler having a plurality of inclined plates which are adjustable as to their angle of inclination from vertical; and adjusting said plates to an inclination closer to vertical when the flow rate of the wastewater is relatively low and further from vertical when the flow rate is relatively high.

10. A method of removing grit particles from wastewater having organic material and a varying flow rate, comprising the steps of:

aerating the liquid in an aeration zone to remove relatively large grit particles in the aeration zone;

directing the liquid into a clarification zone following aeration of the liquid;

utilizing an inclined plate settler in said clarification zone to effect settling of relatively fine grit particles in said clarification zone;

directing effluent from the clarification zone into an effluent line;

recycling controlled amounts of liquid from said effluent line back to the aeration zone in a manner dependent on said flow rate of the wastewater to inhibit settling of organic material; and removing the grit particles that settle in said aeration zone and clarification zone.

* * * * *